United States Patent [19]

Uchida et al.

[11] Patent Number: 5,312,787
[45] Date of Patent: May 17, 1994

[54] CERAMICS COMPOSITE MATERIAL AND METHOD OF PRODUCING THE SAME

[75] Inventors: Kiyoshi Uchida; Yukio Shimokawa; Hiroshi Nomura, all of Aichi; Hirohiko Nakata; Masaya Miyake, both of Hyogo, all of Japan

[73] Assignees: Japan Fine Ceramics Center, Nagoya; Sumitomo Electric Industries, Ltd., Osaka, both of Japan

[21] Appl. No.: 67,490

[22] Filed: May 25, 1993

Related U.S. Application Data

[60] Continuation of Ser. No. 910,694, Jul. 8, 1992, abandoned, which is a division of Ser. No. 879,158, Apr. 30, 1992, Pat. No. 5,190,895, which is a continuation-in-part of Ser. No. 465,206, Mar. 2, 1990, abandoned.

[30] Foreign Application Priority Data

| Jul. 21, 1988 | [JP] | Japan | 63-182715 |
| Aug. 1, 1988 | [JP] | Japan | 63-192421 |
| Aug. 29, 1988 | [JP] | Japan | 63-214619 |
| Oct. 28, 1988 | [JP] | Japan | 63-272375 |

[51] Int. Cl.$^5$ .................................. C03C 14/00
[52] U.S. Cl. ............................ 501/95; 501/5; 501/6; 501/7; 501/8; 501/9; 501/10; 501/32; 264/58
[58] Field of Search .............. 501/5, 6, 7, 8, 9, 10, 501/32, 95; 264/57, 58, 64, 65, 60, 66

[56] References Cited

U.S. PATENT DOCUMENTS

| 4,588,699 | 5/1986 | Brennan et al. | 501/9 |
| 4,615,987 | 10/1986 | Chyung et al. | 501/8 |
| 4,755,489 | 7/1988 | Chyung et al. | 501/8 |
| 4,780,432 | 10/1988 | Minford et al. | 501/32 |
| 4,853,350 | 8/1989 | Chen et al. | 501/9 |
| 4,892,846 | 1/1990 | Rogers et al. | 501/8 |
| 4,897,370 | 1/1990 | Horiguchi et al. | 501/5 |
| 4,919,991 | 4/1990 | Gadkaree | 428/113 |
| 4,935,387 | 6/1990 | Beall et al. | 501/3 |

*Primary Examiner*—Karl Group
*Attorney, Agent, or Firm*—W. G. Fasse; W. F. Fasse

[57] ABSTRACT

A ceramics composite material containing crystallized glass as the matrix and fibers or whiskers of ceramics as a reinforcement material, is obtained by melting original glass to form crystallized glass, compounding the same with fibers or whiskers of oxide ceramics and thereafter crystallizing the original glass. This ceramics composite material does not form any voids and can easily contain at least 50 volume percent of the reinforcement material, whereby a good mechanical strength and fracture toughness are achieved. In the compounding step, the content of the reinforcement can be further increased by forcing out any excess part of the original glass from the reinforcement material by applying pressure to a substance obtained by mixing the original glass with the reinforcement. Further, the ceramics composite material can be efficiently formed into a desired configuration by heating because the original glass flows viscously.

12 Claims, No Drawings

CERAMICS COMPOSITE MATERIAL AND METHOD OF PRODUCING THE SAME

This application is a file wrapper continuation of U.S. Ser. No. 07/910,694, filed Jul. 8, 1992, now abandoned, which is a divisional of U.S. Ser. No. 07/879,158, filed Apr. 30, 1992, now U.S. Pat. No. 5,190,895, which is a continuation in part of U.S. Ser. No. 07/465,206, filed Mar. 2, 1990, now abandoned.

FIELD OF THE INVENTION

The present invention relates to a ceramics composite material. A method of producing the material is also disclosed. Particularly, the invention relates to a ceramics composite material containing crystallized glass as the matrix and fibers or whiskers of ceramics as the reinforcement.

BACKGROUND INFORMATION

There has been proposed a composite material of ceramics having a matrix reinforced by dispersing carbon fibers or fibers or whiskers of ceramics such as silicon carbide in granular matrices of ceramic materials having a high melting point such as alumina, zirconia or the like and thereafter sintering these granular matrices at a high temperature (refer to "Ceramics" issued by Yogyo Kyokai, 22(1987) No.6).

As a method of producing these conventional ceramics composite materials, it has been a general practice to employ ceramics powder as a raw matrix material, mechanically mixing this powder with fibers or whiskers of ceramics in a ball mill or the like, and thereafter sintering the mixture.

When the raw material is thus prepared from ceramics powder, however, it is impossible to sufficiently fill up clearances or interstices between the fibers or whiskers of ceramics with the ceramics powder even by mechanical mixing as the content of the fibers or whiskers of ceramics is increased. As a result, a sufficiently dense sintered body cannot be obtained by sintering, and hence it has been impossible to obtain a satisfactory characteristic such as mechanical strength. Further, mechanical mixing has caused damage and breakage of the fibers or whiskers of ceramics.

Since it is not easy to homogeneously disperse the reinforcement material in the ceramics powder as hereinabove described, the employable reinforcement has been restricted to short fibers or whiskers of ceramics. However, short fibers and whiskers localize any energy dispersion against external loads. Thus, it has been impossible to sufficiently make the best use of the high strength characteristic provided by a mixed reinforcement material, while not much of any characteristic improvement has been attained even if compounding was performed.

On the other hand, there has been studied a method of adhering matrix materials of ceramics to fibers or whiskers of ceramics for serving as the reinforcement, by a CVD process or impregnating the fibers or whiskers in a slurry of ceramics for serving as the matrix and thereafter sintering the same. However, it has been impossible to sufficiently fill up clearances or interstices between the fibers or whiskers, with the matrix material in the CVD process. Further, the method of impregnating the fibers in a slurry has such a disadvantage that moisture etc. contained in the slurry evaporates or volatilizes during the sintering thereby reducing solid residues, thereby easily causing pores in the sintered product.

Thus, in compounding of the matrix material and the reinforcement material, densification of the composite material is difficult as the content of the reinforcement material is increased, and hence the content of the reinforcement has generally remained at 15 to 20 volume percent and 30 volume percent at the most. Accordingly, it has been difficult to obtain a ceramics composite material which is dense and has excellent characteristics such as strength, toughness and the like.

In order to efficiently obtain a machine part such as an engine part or the like through use of such a ceramics composite material, further, a technique is required for forming the same into a desired configuration.

However, since ceramics powder has been employed as a raw matrix material in the conventional forming method, a sintering process is necessarily required similarly to the case of obtaining general ceramics. Further, it has been impossible to use a sintering method at atmospheric pressure since fibers or whiskers of ceramics introduced as the reinforcement material prevent densification of the sintered body.

An attempt has been made for forming a mixture obtained by mixing ceramics powder serving as the raw matrix material and fibers or whiskers of ceramics serving as the reinforcement material, with a mechanical press and sintering the same by hot pressing or the like ("FC Report" issued by Shadan Hojin Nippon Fine Ceramics Kyokai, Vol. 4(1986) No. 6, for example).

Therefore, it has barely been possible to obtain a mere simple configuration such as a plate-type or pole-type one. In order to obtain a configuration of an engine part or the like, for example, it is necessary to cut a portion of a certain configuration from a composite material compact having a simple configuration and finish the same to the final configuration through a step such as grinding with a diamond grindstone or the like. Such operational steps for obtaining the final configuration of the engine part or the like are very costly and constitute a hindrance to the widespread use of ceramics composite materials.

OBJECTS OF THE INVENTION

Accordingly, it is an object of the present invention to provide a ceramics composite material which has excellent mechanical characteristics such as strength and toughness, and is hence highly reliable, yet not too expensive to make.

Another object of the present invention is to provide a method of producing a ceramics composite material which is dense and capable of increasing the content of the reinforcement made of fibers or whiskers of ceramics, in order to attain high mechanical characteristics.

Still another object of the present invention is to provide a method of forming a ceramics composite material which is capable of making structural components having a relatively complicated configuration.

SUMMARY OF THE INVENTION

In the ceramics composite material according to the present invention, crystallized glass is employed for the matrix material, and fibers or whiskers of oxide ceramics excluding CaO are employed for the reinforcement material which is contained in the matrix. In such a composite state, the bond strength between the crystallized glass and the reinforcement at interfaces thereof, is reduced as compared with the material strength of the crystallized glass and as compared to the material strength of the reinforcement material. The term "bond strength" means an external force capable of fracturing the bond when such force is applied to the composite material. The term "material strength" means ultimate or fracturing strength.

In order to obtain the aforementioned ceramics composite material, basically the following steps are carried out. The fibers or whiskers of oxide ceramics excluding CaO are impregnated with softened or molten original glass for forming crystallized glass thereby compounding the same, and thereafter crystallizing the original glass. According to the present invention, the matrix is formed of crystallized glass, which has a mechanical strength and heat resistance equivalent to or higher than that of structural ceramics such as $Al_2O_3$, $ZrO_2$ or the like. Since glass has a high impregnating ability for fibers or whiskers of ceramics, clearances or interstices between the fibers or whiskers of ceramics can be easily and completely filled up by impregnation of the fibers or whiskers with the glass in a softened or molten state. Thus, it is possible to obtain a ceramics composite material having a high content of reinforcement material, e.g. fibers, whereby the composite material becomes dense and flawless.

It is believed that the increase in toughness caused by compounding results from the following two effects. First, a composite material obtained by combining dissimilar materials is not uniform in strength distribution throughout its volume, and hence cracks are going to progress in portions which are inferior in strength, and the cracks are dispersed. Thus, a crack deflection effect is attained to improve the toughness by increasing the energy which is required for fracturing. Second, it is necessary to break fibers or pull out the same by the width of the cracks so that cracks having a certain width progress from interfaces between the fibers and the matrix. Thus, a pull-out effect is attained to improve the toughness since a larger energy is required for fracturing.

According to the present invention, the bond strength at interfaces between the crystallized glass, serving as the matrix and the reinforcement material is made smaller than both the material strength of the crystallized glass and the material strength of the reinforcement material. This bond strength is selected, because it has been found that cracks are propagated through the crystallized glass or propagated to partially break the fibers or whiskers if the bond strength at the interfaces between the crystallized glass and the reinforcement exceeds the fracture strength levels of the aforementioned respective materials, and hence the aforementioned pull-out effect will not effectively act, whereby the fracture toughness is abruptly reduced.

The bond strength at the inter-Laces can be adjusted by a temperature treatment applied when the original glass for forming crystallized glass, is compounded, e.g. impregnated with the fibers or whiskers of oxide ceramics excluding CaO. The temperature for attaining a preferable bond strength at the interfaces is varied with the types of crystallized glass and the fibers or whiskers of ceramics.

The crystallized glass employed in the present invention is glass which is made crystalline through a heat treatment, irradiation of ultraviolet rays or the like. It is preferable to employ $Li_2O$-$SiO_2$-$Al_2O_3$, $Na_2O$-$Al_2O_3$-$SiO_2$, $MgO$-$Al_2O_3$-$SiO_2$, $PbO$-$ZnO$-$B_2O_3$, $ZnO$-$B_2O_3$-$SiO_2$, $SiO_2$-$B_2O_3$-$Al_2O_3$-$MgO$-$K_2O$-$F$ or the like, which is excellent in strength and heat resistance, to form the crystallized glass.

Common glass has a low heat resistance since its softening point is low, and its flexural strength is about 5 to 10 $kg/mm^2$, while the heat resistance is greatly improved and the strength is improved to about 30 to 60 $kg/mm^2$ by crystallization. These characteristics of the crystallized glass are sufficient for using crystallized glass as a structural material, and hence such crystallized glass is often called "glass ceramics".

Further, glass has a melting point of about 600° to 1300° C., which is lower than the sintering temperature of ceramics powder, 1400° to 1700° C. in the case of $Al_2O_3$, for example, and hence the matrix material does not degrade the ceramics serving as the reinforcement material, when the reinforcement material is impregnated in the form of fibers or whiskers of ceramics having a maximum heat-resisting temperature of 1200° to 1300° C., by the matrix material in a molten state. The crystallizing temperature of glass is further lower than its melting temperature.

Since the crystallized glass has an oxidizability, the surfaces of fibers are so easily degraded that the fibers are oxidized to generate $SiO_2$, when non-oxide fibers such as SiC are employed as the reinforcement, for example. In order to prevent such degradation thereby sufficiently effectuating the characteristics of the reinforcement, the invention teaches using oxide ceramic materials having a large oxidation resistance. Preferably, oxide ceramics are used for the reinforcing fibers or whiskers containing oxygen of at least 10 percent by weight of the reinforcing fiber or whisker material.

For producing the composite material according to the present invention long fibers of ceramics having a fiber length of at least 10 cm, can be introduced into the molten matrix material with no damage to the fibers while maintaining the lengths of the fibers since mechanical mixing as hereinabove described, is not particularly required. Consequently, resistance against external loads and dispersion of energy are achieved by the relatively long fibers, whereby strength and fracture toughness of the composite material are further improved.

According to the present invention, the content of the reinforcement materials in the ceramics composite material can be easily increased to at least 50 volume percent. Particularly, according to a method of impregnating the reinforcement material with original glass which is in a softened or molten state under pressurization while simultaneously forcing out an excess proportion thereof from interstices between reinforcement material elements, the content of the reinforcement material can be easily increased to at least 70 volume percent of the composite material. According to this method, a composite material which is dense since it does not have voids can be easily obtained. Thus, increasing the content of the reinforcement in the dense state directly results in an improvement in the mechanical strength and fracture toughness of the composite material.

The aforementioned pressurization can be performed by hot pressing, pressure casting or the like, and the degree of pressurization can be appropriately set in response to the content of the reinforcement material in the composite material to be obtained.

In the present invention, it does not matter what states the fibers or whiskers of the ceramics employed for the reinforcement are in when the same are added.

They may remain in the states of fibers or whiskers, for example, or they may be reshaped in the form of a sheet such as a woven fabric, or any desired configuration.

According to the present invention, for combining the fibers with matrix material, basically employed is the method of impregnating the reinforcement fibers with original glass in a softened or molten state for then forming the crystallized glass by crystallizing the original glass after impregnating, as hereinabove described. With this method it is possible to form a ceramics composite material by by contacting e.g. impregnating the fibers with the original glass to be transformed into crystallized glass, forming the composite material into a prescribed configuration at a temperature causing viscous flow of the original glass and thereafter crystallizing the original glass. In this forming method, the original glass and the reinforcement material, e.g. fiber fabric may be combined with each other as desired, e.g. in a laminate state. Further, the composite substance may be obtained by bringing the original glass into a softened or molten state and then impregnating the reinforcement material with the molten glass, or impregnating the reinforcement material with the molten glass under pressure. Then, the composite substance is formed into a desired configuration by bringing the original glass into a viscous flowing state by heating the same. This forming step is generally carried out by introducing the composite substance into a mold having a configuration corresponding to the prescribed configuration, and performing a hot mold pressing. In forming into a hollow configuration such as that of a cylindrical body provided with a bottom, etc., a method of pressing the composite substance against the inner surface of a mold by introducing a high-pressure gas into the interior of the mold for the forming, is advantageously applied. In the case of forming the composite substance into a cylindrical configuration, it is advantageous to form the composite material into a sheet and cylindrically rolling the sheet into the cylindrical shape. Particularly, in forming into a relatively complicated configuration such as a hollow configuration or the like, it is preferable to first preform the composite substance to a configuration close to the desired configuration and then to apply a finishing steps.

BEST MODE FOR CARRYING OUT THE INVENTION

Experimental Example

Ceramics whiskers (0.5 $\mu$m in diameter) of alumina ($Al_2O_3$) were mixed with original glass powder having a 2.0 $\mu$m average particle size for forming $MgO-Al_2O_3-SiO_2$ crystallized glass, and after application of a dry pressing, the original glass was molten and the whiskers were impregnated by the molten glass in a HIP process. The content of the whiskers was adjusted to 60 volume percent by forcing out an excess portion of the original glass while applying the HIP process.

In the aforementioned operation, the temperature for compounding was varied within a range of 1000° C. to 1400° C. in order to vary the bond strength at the interfaces of the crystallized glass and the whiskers. Then, the original glass was heated to 900° C. for crystallization, thereby producing the ceramics composite material.

The obtained ceramics composite material had a flexural strength [kg/mm$^2$] and a fracture toughness value [MN.m$^{-3/2}$] measured by the indentation method, depending on the HIP or compounding temperature as shown in Table 1.

TABLE 1

| Compounding Temperature | Flexural Strength | Fracture Toughness Value |
|---|---|---|
| 1100 | 64 | 22.4 |
| 1200 | 75 | 18.5 |
| 1300 | 63 | 6.3 |
| 1400 | 54 | 2.3 |

With the compounding temperatures of 1100° to 1200° C., cracks after strength tests were mainly propagated through the interfaces between the crystallized glass and the ceramics whiskers, and the fracture toughness had rather high values. This means that the bond strength at the interfaces is lower than the material strength levels of the respective materials. With the compounding temperatures of 1300° to 1400° C., on the other hand, cracks were mainly propagated through the crystallized glass such that parts thereof progressed while breaking the whiskers, and the fracture toughness had low values. This means that the bond strength at the interfaces is higher than the material strength levels of the respective materials.

Experimental Example 2

A woven fabric made of ceramics fibers, 3 $\mu$m in diameter, of mullite ($3Al_2O_3.2SiO_2$) and original glass powder having an average particle size of 3.0 $\mu$m for forming $Li_2O-SiO_2-Al_2O_3$ crystallized glass, were stacked, and compounded by melting/impregnating the original glass powder into the woven fabric at 1200° C. and pressurized by hot pressing. Then, the impregnated original glass was crystallized at a temperature of 800° C., to produce several ceramics composite materials having matrices of crystallized glass and different fiber contents.

The flexural strength and fracture toughness values for these materials were measured by the indentation method similarly as for Experimental Example 1. Table 2 shows the result of the measurement.

TABLE 2

| Fiber Content vol. % | Flexural Strength | Fracture Toughness Value |
|---|---|---|
| 10 | 55 | 2.5 |
| 30 | 62 | 3.0 |
| 40 | 67 | 3.5 |
| 50 | 85 | 10.5 |
| 60 | 87 | 17.4 |
| 70 | 85 | 25.6 |

The composite materials having a fiber content of 50 to 70 volume percent exhibited particularly excellent strength values, as well as greatly improved fracture toughness values. Further, cracks after strength tests, were propagated in the interfaces between the crystallized glass and the ceramics fibers, to show that the bond strength values at the interfaces were lower than the material strength levels of the respective materials.

When the compounding temperature was changed to 1300° C. or more, from 1200° C. in the above Experimental Example 2, the fracture toughness values were abruptly lowered to exhibit values of 5.3 with a fiber content of 50 volume percent, 4.8 with 60 volume percent. and 5.2 with 70 volume percent. Cracks of these composite materials were mainly propagated through the crystallized glass, and parts thereof progressed while breaking the ceramics fibers.

Experimental Example 3

A woven fabric formed of continuous fibers of $Al_2O_3$ having a diameter of 5 μm and a tensile strength of 200 kg/mm$^2$, and a mat-type compact formed of short fibers of $Al_2O_3$ having lengths within the range cf 0.5 to 2.0 cm were used as the reinforcement material, and subjected to a heat treatment in atmospheric pressure and at 1200° C. for three hours in the presence of original glass powder, having a particle size of not more than 100 mesh, for forming $MgO$-$Al_2O_3$-$SiO_2$ crystallized glass containing $TiO_2$, $ZrO_2$ and $SnO_2$. The heat treatment melted the original glass powder, whereby the reinforcement material was impregnated by the glass melt. Thereafter the original glass was crystallized at 1100° C., to precipitate crystalline phases mainly formed cordierite phases. The so made composite materials were tested for their flexural strength and fracture toughness values similarly, to Experimental Example 1. Table 3 shows the results of the measurement.

TABLE 3

| Reinforcement | Crystalization | Flexural Strength | Fracture Toughness |
|---|---|---|---|
| Woven Fabric of Relatively Long Fibers | no | 20 | 9 |
| Woven Fabric of Relatively Long Fibers | yes | 110 | 18 |
| Short Fiber Mat | yes | 45 | 8 |

From the results shown in Table 3, it is understood that strength and fracture toughness are greatly improved by crystallizing the glass forming the matrix, and that the matrices of the same crystallized glass are made superior in strength and fracture toughness when the fibers contained therein are relatively long fibers.

Experimental Example 4

Original glass powder having a particle size of not more than 200 mesh to form $Li_2O$-$SiO_2$-$Al_2O_3$ crystallized glass, was mixed with water to prepare a slurry, and tapes obtained by unidirectionally shaping long fibers of $ZrO_2$, were successively dipped into the slurry and then extracted, stacked, and dried. At this time the fiber content was adjusted to 50 volume percent of the composite material.

Thereafter, the dried laminate was heated to 1400° C. in atmospheric air to melt/impregnate the glass in the fibers for compounding. A heat treatment for crystallization was performed at 900° C.

The composite material thus obtained exhibited respective values of 110 kg/mm$^2$ in flexural strength and 19.5 MN.m$^{-3/2}$ in fracture toughness.

Experimental Example 5

Woven fabrics formed of long fibers of SiC, $Si_3N_4$ and $SiO_2$ respectively were employed as the reinforcement material and subjected to a heat treatment in atmospheric air at 1150° C. for three hours, in the presence of original glass powder having a particle size of not more than 100 mesh for forming $MgO$-$Al_2O_3$-$SiO_2$ crystallized glass containing $TiO_2$, $ZrO_2$ and $SnO_2$. The heat treatment melted the original powder and the melted glass impregnated the reinforcement material. Thereafter the glass was crystallized at 900° C., to obtain composite materials. The strength and fracture roughness values were measured by the same processes as those of Experimental Example Table 4 shows the results of the measurement.

TABLE 4

| Reinforcement Fiber | Flexural Strength | Fracture Toughness Value |
|---|---|---|
| SiC | 5 | 2.5 |
| $Si_3N_4$ | 3 | 3.0 |
| $SiO_2$ | 60 | 13.0 |

In the composite materials employing SiC and $Si_3N_4$, which are non-oxide ceramics, as the fibers for the reinforcements, the fibers were degraded by the crystallization of the glass, and the strength and fracture toughness values thereof exhibited rather low values. On the other hand, no degradation of the fibers as described above was noticed in the composite material employing fibers of $SiO_2$, which is an oxide ceramics material, as the reinforcement, while the same exhibited high values in strength and fracture toughness as shown in Table 4.

Experimental Example 6

30 layers of plain weave fabrics of ceramics fibers mainly composed of $Al_2O_3$ and having diameters within the range of 2 to 3 μm and a tensile strength of 200 kg/mm$^2$, and 30 layers of original glass powder having an average particle size of 10.5 μm for forming $MgO$-$Al_2O_3$-$SiO_2$ crystallized glass containing $TiO_2$ and $ZrO_2$, were alternately stacked. The volume of voids observed when 30 layers of the woven fabrics employed herein were slacked and pressurized at a pressure of 15 kg/cm$^2$, was 85 cm$^3$, while the actual volume of the employed original glass powder was 655 cm$^3$.

The laminate obtained in the aforementioned manner was preheated in a hot press at 1200° C. for one hour and thereafter pressurized in a direction orthogonal to the woven fabrics, at a pressure of 15 kg/cm$^2$, and such pressurization was continued for 1.5 hours until nc excess original glass was discharged from an exhaust port provided in a lower part of the mold. The material thus obtained was cooled and thereafter the original glass was crystallized at 1000° C., to produce a ceramics composite material having a matrix of crystallized glass.

The obtained ceramics composite material had a fiber content of 75 volume percent, a flexural strength of 35 kg/mm$^2$, and a fracture toughness value of 23.5 MN.m$^{-3/2}$.

Experimental Example 7

50 layers of prepreg sheets of ceramics fibers mainly composed of $SiO_2$ and having diameters of 3 μm and tensile strength of 150 kg/mm$^2$, and 50 layers of original glass powder having an average particle size of 5.0 μm for forming $Li_2O$-$Al_2O_3$-$SiO_2$ crystallized glass, were alternately stacked. The volume of voids observed when 50 layers of the prepreg sheets employed herein were pressurized at a pressure of 30 kg/cm$^2$, was 150 cm$^3$, while the actual volume of the original glass powder employed herein was 750 cm$^3$.

The laminate thus obtained was preheated in a HIP apparatus at 1200° C. for one hour, and thereafter pressurized with argon gas under a pressure of 200 kg/cm$^2$. An excess portion of the original glass was forced out into the outer peripheral portion of the composite thus obtained. The entire composite was cooled and thereafter the forced-out part of the original glass was removed, while the original glass was crystallized at 800° C. to produce a ceramics composite material having a matrix of crystallized glass.

The obtained ceramics composite material had a fiber content of 85 volume percent, a flexural strength of 95 kg/mm$^2$, and a fracture toughness value of 24.7 MN.m$^{-3/2}$.

Experimental Example 8

Original glass powder having an average particle size of 1.5 μm for forming $LiO_2$-$Al_2O_3$-$SiO_2$ crystallized glass was heated/impregnated in a mat-type woven fabric of alumina fibers having an average diameter of 3.0 μm mainly composed of $Al_2O_3$ to compound the two materials. A sheet-type preform of this composite was introduced into a mold of inconel and heated to 1100° C. for hot press forming. The time required for the forming was 10 minutes for preheating and 15 seconds for hot pressing. This is an extremely short time as compared with sintering of ceramics powder. The compact was formed in accordance with the configuration of the mold by viscous flow, with no defects such as cracks.

Then, this compact was crystallized at 800° C. for 60 minutes, to obtain a ceramics composite material having a matrix of crystallized glass. The so obtained ceramics composite material had a flexural strength of 30 kg/mm$^2$ and a fracture toughness value of 15 MN.m$^{-3/2}$ with a dimensional error of not more than ±0.5%, while its surface state was smooth and required no specific surface finish working.

Experimental Example 9

Three layers of mat-type woven fabrics of mullite fibers having an average particle size of 2.0 μm, and three layers of original glass having an average particle size of 1.5 μm for forming $LiO_2$-$Al_2O_3$-$SiO_2$ crystallized glass were alternately stacked. A sheet-type preform of 100 mm in width formed of this laminate was heated to 1200° C., and rolled from an end while applying tensile force, to obtain a pipe-type body of 30 mm in diameter and a wall thickness of 4 mm. The time required for forming was five minutes including preheating, while no defects were caused by the forming.

Thereafter this body was crystallized at 850° C. for 35 minutes, to obtain a ceramics composite material having a matrix of crystallized glass. This ceramics composite material had a flexural strength of 45 kg/mm$^2$ and a fracture toughness value of 14 MN.m$^{-3/2}$.

Experimental Example 10

A mat-type woven fabric of alumina fibers having an average diameter of 3.0 μm was preformed into a configuration close to the configuration of a hollow bottle such as a beer bottle, and original glass powder having an average particle size of 5.0 μm for forming $LiO_2$-$Al_2O_3$-$SiO_2$ crystallized glass, was heated and the fibers were impregnated with the glass to form the composite. A preform of this composite, having the configuration of a hollow bottle, was introduced into a mold of stainless steel having a corresponding configuration of a hollow bottle and heated to 1000° C. Simultaneously, a high pressure gas was introduced into the interior of the mold to press the softened preform against the inner surface of the mold. A gas pressure of 100 kg/mm$^2$ was sufficient for this purpose to form a bottle by a viscous flow. The time required for forming was 10 minutes including preheating. Defects were not caused by the forming.

Thereafter this compact was crystallized at 900° C. for 15 minutes, to obtain a ceramics composite material having a matrix of crystallized glass. This ceramics composite material had a flexural strength of 40 kg/mm$^2$, a fracture toughness of 16 MN.m$^{-3/2}$, and exhibited no creep deformation up to 1000° C.

When the preform of the composite was not preformed to a configuration close to the final configuration, cracking of the preform was easily caused at corner portions during the subsequent final forming resulting frequently in defects.

The composite material according to the present invention is suitable for employment as a heat-resistant structural material, such as a material for an engine made of ceramics.

Although the invention has been described with reference to specific example embodiments it will be appreciated that it is intended to cover all modifications and equivalents within the scope of the appended claims.

We claim:

1. A method of producing a ceramic composite material having a ceramic reinforcing material embedded in a crystallized glass matrix, comprising the steps of:
   (a) introducing not yet crystallized original glass into interstices of oxide ceramic reinforcing material, thereby using initially an excess volume of original glass compared to a volume of original glass needed to fill said interstices when said ceramic oxide reinforcing material is in a compressed state, thereby forming a preliminary composite material,
   (b) heating said preliminary composite material to a temperature exceeding the softening temperature of said original glass and not more than the softening temperature of said oxide ceramic reinforcing material, whereby said original glass is softened,
   (c) pressurizing said preliminary composite material sufficiently for reducing the volume of said interstices, whereby said pressurizing removes an excess of said original glass from said interstices, and
   (d) crystallizing said original glass remaining in said interstices to form said ceramic composite material in which said glass matrix is crystallized glass, so that the amount of oxide ceramic reinforcing material is at least 70 vol. % and the amount of crystallized matrix material is at most 30% by vol.

2. The method of claim 1, wherein said crystallized glass of said glass matrix is selected from the group consisting of $Li_2O$-$SiO_2$-$Al_2O_3$, $Na_2O$-$Al_2O_3$-$SiO_2$, $Na_2O$-$CaO$-$MgO$-$SiO_2$, $MgO$-$Al_2O_3$-$SiO_2$, $PbO$-$ZnO$-$B_2O_3$, $ZnO$-$B_2O_3$-$SiO_2$, and $SiO_2$-$B_2O_3$-$Al_2O_3$-$MgO$-$K_2O$-F.

3. The method of claim 1, wherein said oxide ceramic reinforcing material is selected from the group consisting of $Al_2O_3$, $SiO_2$, $ZrO_2$, and $3Al_2O_3.2SiO_2$.

4. The method of claim 1, wherein said original glass is introduced into said interstices in the form of a glass powder.

5. A method of producing a ceramic composite material having a ceramic reinforcing material embedded in a crystallized glass matrix material, comprising the steps of:
   (a) preparing plies of oxide ceramic reinforcing material,
   (b) impregnating said plies with a not yet crystallized original glass to form impregnated plies, (c) laminating said impregnated plies to form a stack,
(d) heating said stack to a temperature sufficient to cause a viscous flow of said original glass in said heated stack,
(e) forming said heated stack into a configuration,
(f) pressing said configuration for removing excess original glass so that the amount of oxide ceramic reinforcing material is at least 70% by vol. and said matrix material is 30% by vol. at the most, and
(g) crystallizing said original glass in said configuration, whereby said oxide ceramic reinforcing material becomes embedded in said crystallized glass matrix.

6. The method of claim 5, wherein said steps of impregnating and laminating are performed by alternately stacking plies of fabric of oxide ceramic reinforcing materials with layers of original glass powder to form said stack.

7. The method of claim 5, wherein said steps of impregnating and laminating are performed by preparing a watery slurry of said original glass in powder form, dipping said plies into said slurry, and then stacking said plies for form said stack of laminate state.

8. The method of claim 5, wherein said heating, said forming, and said pressing are performed in a hot press.

9. A method of producing a ceramic composite material having a ceramic reinforcing material embedded in a crystallized glass matrix material, comprising the steps of:
(a) preparing plies of oxide ceramic reinforcing material,
(b) impregnating said plies with a not yet crystallized original glass to form impregnated plies,
(c) preshaping said impregnated plies to form a hollow configuration,
(d) inserting said hollow configuration into a mold,
(e) heating said hollow configuration to a temperature sufficient to cause a viscous flow of said original glass in said mold,
(f) forming said heated hollow configuration in said mold by introducing high pressure gas into said hollow configuration in said mold for pressing said hollow configuration against an inner surface of said mold for removing excess original glass matrix material so that at least 70% by vol. of oxide ceramic reinforcing material 30% by vol. of matrix material at the most are present in said ceramic composite material, and
(g) crystallizing said original glass in said configuration, whereby said oxide ceramic reinforcing material becomes embedded in said crystallized glass matrix, and removing said hollow configuration from said mold.

10. A method of producing a ceramic composite material having a ceramic reinforcing material embedded in a crystallized glass matrix material, comprising the steps of:
(a) preparing a plurality of plies of oxide ceramic reinforcing materials,
(b) impregnating and laminating said plies with a not yet crystallized original glass by applying a first layer of said original glass onto a first ply, covering said first glass layer with a second ply, and continuing until a laminate sheet is formed of a plurality of plies alternating with a plurality of original glass layers,
(c) heating said laminate sheet to a temperature sufficient to cause a viscous flow of said original glass in said laminate sheet,
(d) cylindrically rolling said heated laminate sheet while applying tensile force to said laminate sheet for forming a cylindrical configuration and for simultaneously removing excess original glass matrix material so that at least 70% by vol. of oxide ceramic reinforcing material and 30% by vol. of matrix material at the most are present in said ceramic composite material, and
(e) crystallizing said original glass in said cylindrical configuration, whereby said oxide ceramic reinforcing material becomes embedded in said crystallized glass matrix in said cylindrical configuration.

11. A method of producing a ceramic composite material having a ceramic reinforcing material embedded in a crystallized glass matrix, comprising the steps of:
(a) preparing plies of oxide ceramic reinforcing materials,
(b) impregnating said plies with a not yet crystallized original glass to form impregnated plies,
(c) preshaping said impregnated plies to form a first configuration closely approximating a second final configuration,
(d) heating said approximate first configuration to a temperature sufficient to cause a viscous flow of said original glass,
(e) forming said heated first configuration into said second final configuration while applying pressure for removing excess original glass matrix material so that at least 70% by vol. of oxide ceramic reinforcing material and 30% by vol. of matrix material at the most are present in said ceramic composite material, and
(f) crystallizing said original glass in said configuration, whereby said oxide ceramic reinforcing material becomes embedded in said crystallized glass matrix.

12. The method of claim 11, wherein said plies are prepared as a woven fabric mat of fibers having an average diameter of 3.0 $\mu$m, and wherein said impregnating step is performed by introducing original glass powder having an average particle size of 5.0 $\mu$m, into interstices in said woven fabric mat.

* * * * *

UNITED STATES PATENT AND TRADEMARK OFFICE
CERTIFICATE OF CORRECTION

PATENT NO. : 5,312,787

DATED : May 17, 1994

INVENTOR(S) : Kiyoshi Uchida; Yukio Shimokawa; Hiroshi Nomura; Hirohiko Nakata; Masaya Miyake It is certified that error appears in the above-identified patent and that said Letters Patent is hereby corrected as shown below:

Title page, item
[30] insert the following missing Priority Data:
--July 21, 1989       PCT.......PCT/JP89/00735--.

Col. 3, line 55, replace "inter-Laces" by --interfaces--.

Col. 8, line 2, after "Example" insert --1.--;

line 39, replace "nc" by --no--;

line 64, replace "200 kg/cm$^2$" by --2000 kg/cm$^2$--.

Claim 7, Col. 11, line 23, replace "for" by --to--, replace "of" by --or--.

Signed and Sealed this

Twentieth Day of September, 1994

Attest:

BRUCE LEHMAN

Attesting Officer

Commissioner of Patents and Trademarks